Figure 1:
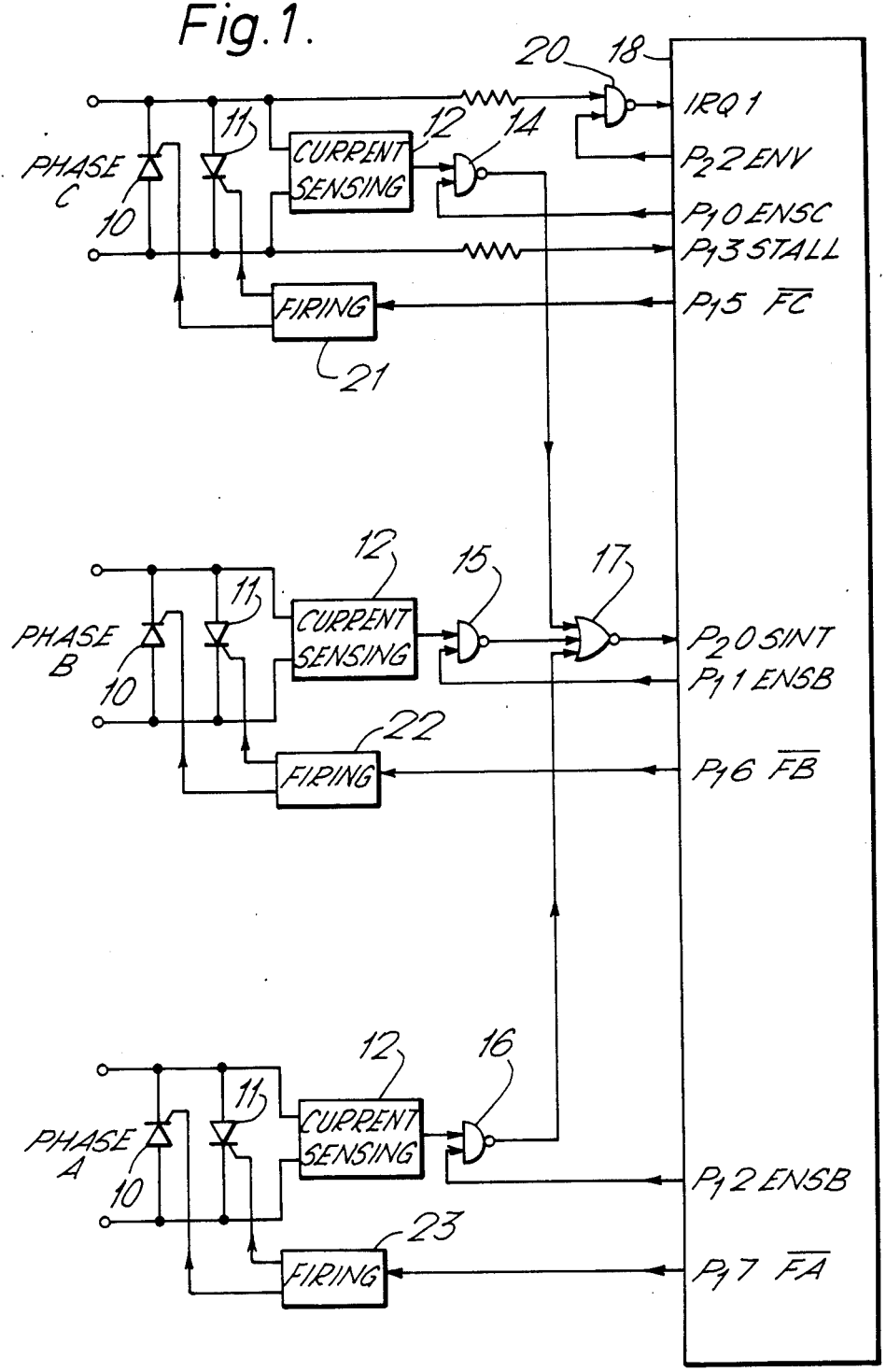

United States Patent [19]

Unsworth

[11] Patent Number: 4,767,975
[45] Date of Patent: Aug. 30, 1988

[54] CONTROLLER FOR INDUCTION MOTORS

[75] Inventor: Peter J. Unsworth, Lewes, England

[73] Assignee: National Research Development Corporation, London, England

[21] Appl. No.: 894,500

[22] Filed: Aug. 4, 1986

Related U.S. Application Data

[63] Continuation of Ser. No. 649,715, Sep. 12, 1984, abandoned.

[30] Foreign Application Priority Data

Sep. 15, 1983 [GB] United Kingdom ............... 8324780

[51] Int. Cl.[4] .............................................. H02P 5/40
[52] U.S. Cl. .................................... 318/729; 318/434
[58] Field of Search ....................... 318/432, 434, 729

[56] References Cited

U.S. PATENT DOCUMENTS

| | | | |
|---|---|---|---|
| 3,670,237 | 6/1972 | Hubel et al. ........................ | 318/416 |
| 4,276,505 | 6/1981 | Bose .................................. | 318/717 |
| 4,307,325 | 12/1981 | Saar ................................ | 318/345 E |
| 4,361,792 | 11/1982 | Davis, Jr. et al. .................. | 318/729 |
| 4,384,243 | 5/1983 | Muskovac .......................... | 318/729 |
| 4,408,149 | 10/1983 | Collins et al. ..................... | 318/729 |
| 4,454,462 | 6/1984 | Spann ................................ | 318/729 |
| 4,468,603 | 8/1984 | Vander Meer ...................... | 318/779 |

FOREIGN PATENT DOCUMENTS

| | | | |
|---|---|---|---|
| WO84/02904 | 6/1984 | PCT Int'l Appl. ................. | 323/205 |
| 2084360 | 4/1982 | United Kingdom ................ | 323/205 |
| 2084359 | 4/1982 | United Kingdom ................ | 323/205 |

OTHER PUBLICATIONS

Toth, A., "Energy Savings in an Induction Motor Using the 8022 Microcontroller", Intel. Application Note AP. 94, May 1980.
Chan et al., "A Microprocessor-Based Current Controller for SCR-DC Motor Drives", IEEE Transactions on Industrial Electronics and Control Instrumentation, vol. IECI-27, No. 3, Aug. 1980, pp. 169-176.

Primary Examiner—David Smith, Jr.
Attorney, Agent, or Firm—Cushman, Darby & Cushman

[57] ABSTRACT

Many induction motor controllers employ a reference angle relative to the supply voltage which is a target for the phase lag of current behind voltage but the choice of the optimum reference angle for energy saving varies from motor to motor. In the present invention firing signals for thyristors connected between a supply and a motor to be controlled are generated by firing circuits under the control of a microprocessor 18. The firing angle for the thyristors is continuously adjusted according to the phase lag as indicated by supply voltage zero crossings and current sensing circuits, load on the motor, and a signal indicating the tendency of the motor to stall obtained from the back e.m.f. of the motor. Using the said signal can be regarded as equivalent to adjusting the reference angle for the optimum value mentioned above. A procedure for starting a motor and setting the initial value of the reference angle is also described.

20 Claims, 12 Drawing Sheets

MAIN PROGRAM LOOP

CALCULATION SUBROUTINE

VOLTAGE INTERRUPT ROUTINE

FIRING INTERRUPT ROUTINE

FIRING PULSE SUBROUTINE

STALL TESTING SUBROUTINE

CONTROLLER FOR INDUCTION MOTORS

This is a continuation of application Ser. No. 649,715, filed Sept. 12, 1984, which was abandoned upon the filing hereof.

The present invention relates to a controller for controlling the supply of power to an induction motor.

The power consumption W of a single phase induction motor is $W = VI \cos \phi$, where V and I are the r.m.s. supply voltage and current drawn, and $\phi$ is the phase lag of the current behind the voltage waveform. At rated load the phase lag and the power factor $\cos \phi$ are dependent on the motor. At well below rated load, the power consumption decreases partly because the motor draws reduced current but more importantly because the phase lag $\phi$ increases and reduces the power factor. This reduces the efficiency of the motor because losses from resistive heating and hysteresis are not reduced in proportion to power consumption. Similar effects occur in three phase induction motors.

Controllers for induction motors and some of the problems arising in producing such controllers are described in UK patent application Nos. 8129043, 8129044, 8214255 and 8312938, the last of which was published under U.K. No. 2120422 A claiming priority from the aforesaid U.K.P.A. No. 8214255.

Many induction motor controllers employ a reference phase angle relative to the supply voltage which is a target for the phase lag of current behind voltage for the motor. Phase lsg is controlled by firing angle, the angle at which semiconductor switches such as thyristors or triacs in the controller are fired to supply current to the motor. In such controllers the choice of the correct reference angle for optLaum energy saving varies from motor to motor, with load and other variables such as supply voltage. In many cases where retrofitting is carried out the optimum reference angle is not known, except rather uncertainly at full load.

According to a first aspect of the present invention there is provided a power controller for an induction motor comprising one or more switching means for connection between an alternating current supply and an induction motor which is to be energised from the supply, there being one switching means for the, or each, phase of the supply and the or each switching means becoming conductive when a firing signal is applied to that switching means and remaining conductive until the current supply thereto ceases, and processor means for generating a stall signal representative of the extent of stalling of a motor connected to the controller, and for generating firing signals at phase angles in relation to the supply voltage, which are variable throughout a substantial range in dependence upon the phase lag of current behind voltage in at least one phase of supply to the motor and additionally upon the stall signal.

One advantage of controllers according to the invention is that the firing angle, in relation to the supply voltage, at which the switching means are fired is adjusted towards the optimum for energy saving when load changes, or other changes, occur causing a tendency towards stalling.

Preferably the power controller is arranged to determine the load on the motor and generate firing signals at phase angles which are also dependent on the motor load.

A controller according to the invention may include current sensing means for generating first signals when the current through the, or at least one of the, switching means ceases, voltage sensing means for generating second signals representative of the phase of at least one of the supply phases, and means for determining, form the first and second signals, the phase lag of current behind voltage of at least one of the phases, the processor means then determining an error signal from the phase lag and a reference angle to generate firing signals at times which depend on both the error signal and the stall signal.

Where the power controller is for a three phase induction motor, the means for generating trigger signals may do so at times which are 60° later (that is when the supply phase angle has progressed by 60°) than the last previous trigger signal adjusted by an angle determined from an equation having the following terms:

a proportional term dependent on the present value of the error signal, a differential term dependent on the difference between the present error signal and the previous error signal, an integral term obtained by considering the present error signal, the previous error signal and the preceding previous error signal, and a term dependent on an adjustment signal which is dependent on the amount of stalling occurring in a predetermined time interval.

In a preferred alternative the equation may have the following two terms:

a term dependent on the difference between the present error signal and the previous error signal, and a term dependent on rate of change of the error signal and an adjustment signal itself dependent on the amount of stalling occurring in a predetermined time interval.

The onset of stalling may be determined by the means for generating a stall signal by detecting when the back e.m.f. from the motor in one or more phases falls to a predetermined level and counting the number of stall actions in further predetermined time intervals. When the number of stalling actions exceeds a predetermined number, such as one, the said adjustment signal may be increased by a predetermined step. Since the load on the motor can be determined, when the motor is running at near optimum phase lag, from the time interval in each half cycle of each phase of the supply voltage in which current is not supplied to the motor, the means for generating the stall signal may be arranged to adjust the size of the said steps in accordance with the interval of nonconduction by one or each phase and therefore the motor load.

Preferably the reference angle used in determining the error signal is variable and further it is preferably automatically set to substantially the same value as the current phase lag when the motor ceases stalling actions during start-up.

An advantage of setting the reference signal in this way is that it is automatically set up for each motor regardless of type and by employing the said adjustment signal the reference signal is, in effect, continually adjusted.

According to a second aspect of the present invention there is provided a method of controlling an induction motor comprising deriving a first signal representative of the phase lag of current behind voltage in the, or at least one of the, phases of supply to the motor, deriving a second signal representative of the extent of stalling by the motor, and generating firing signals which are variable throughout a substantial range of phase angles in relation variable to a supply voltage for the motor, the said phase angles being dependent on the first and second signals.

It will be apparent from the above and from the specific description of the invention that the invention can be applied to single phase induction motors or induction motors having other numbers of phases than three.

Figure 2:
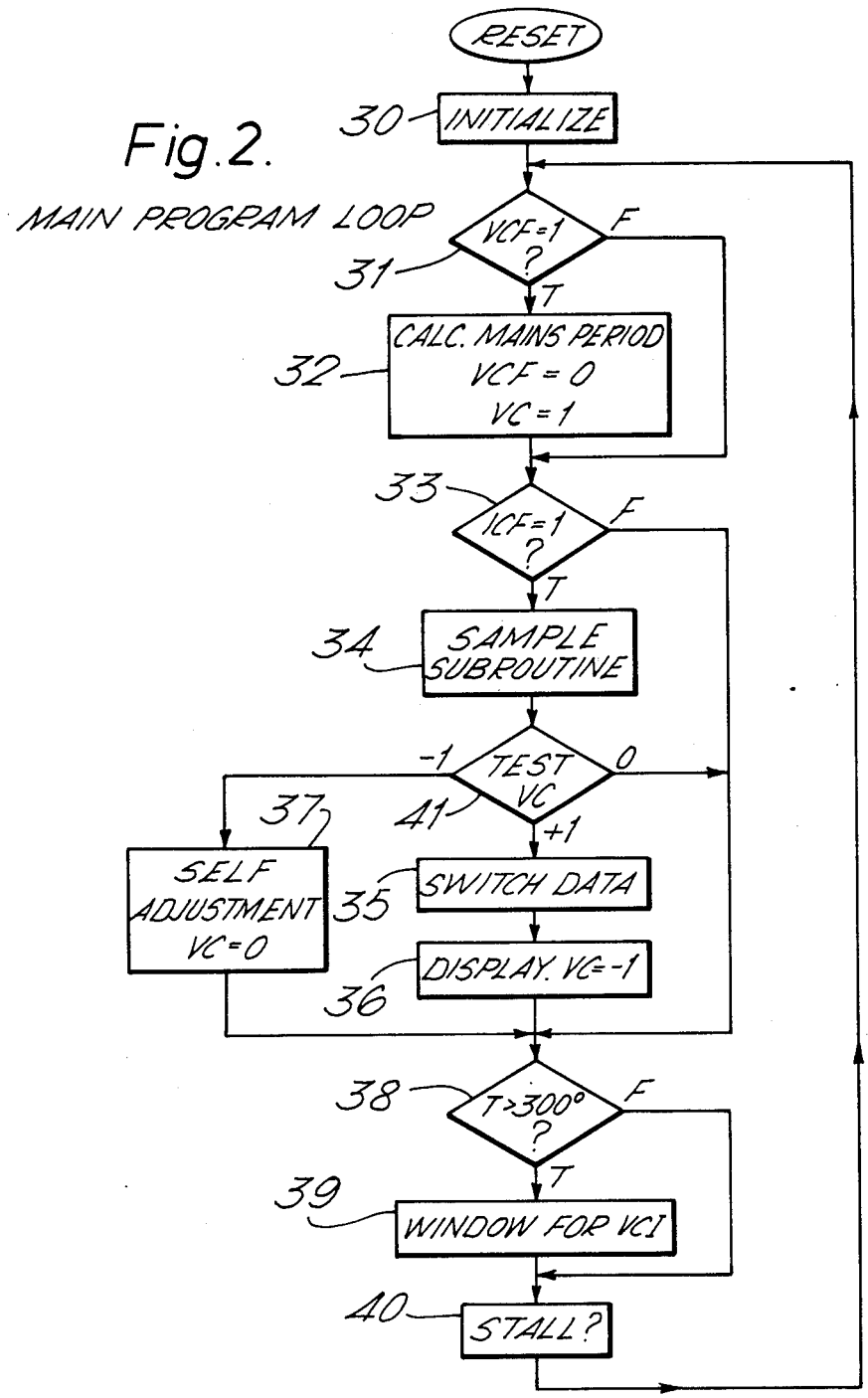
Figure 3:
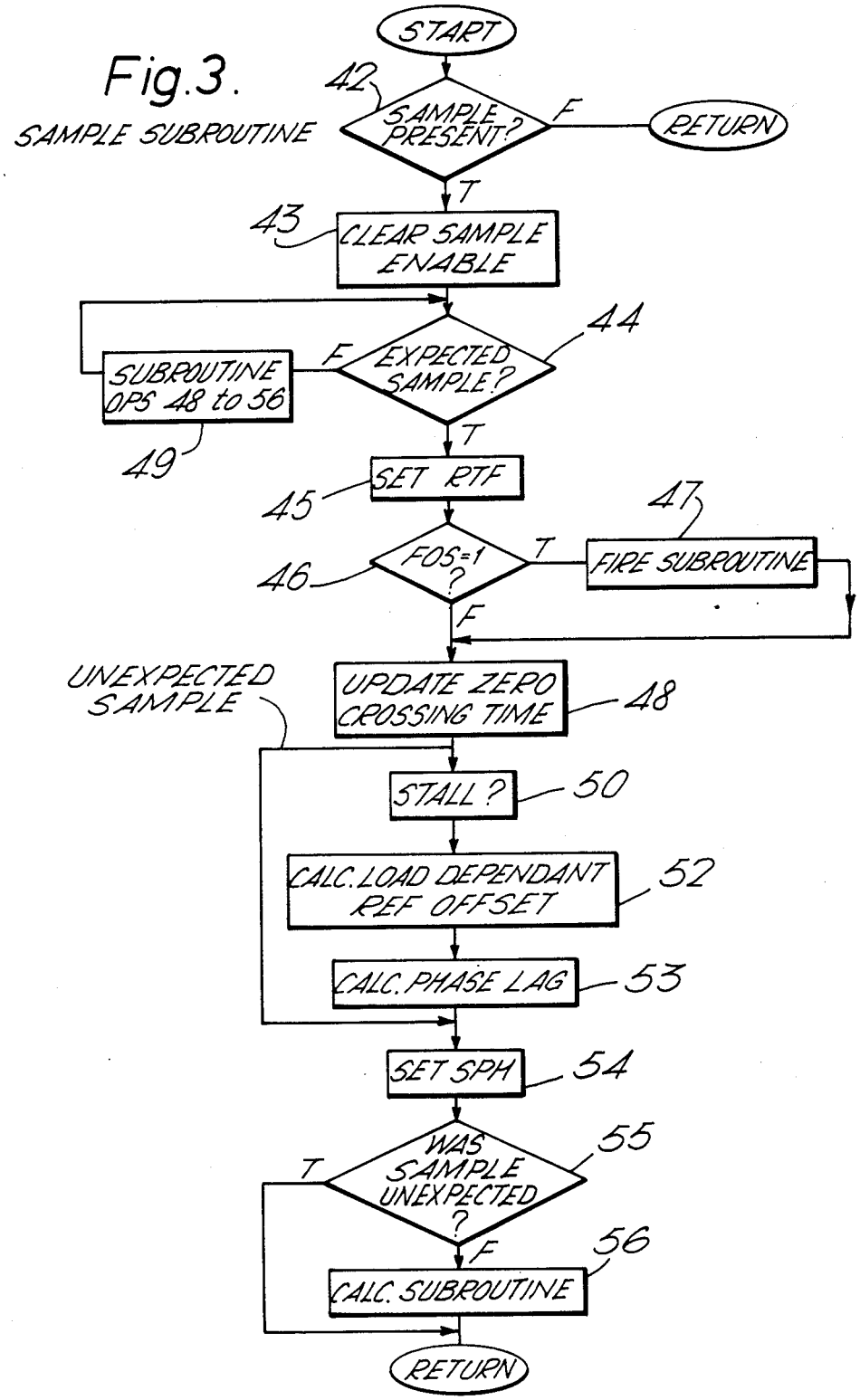
Figure 4:
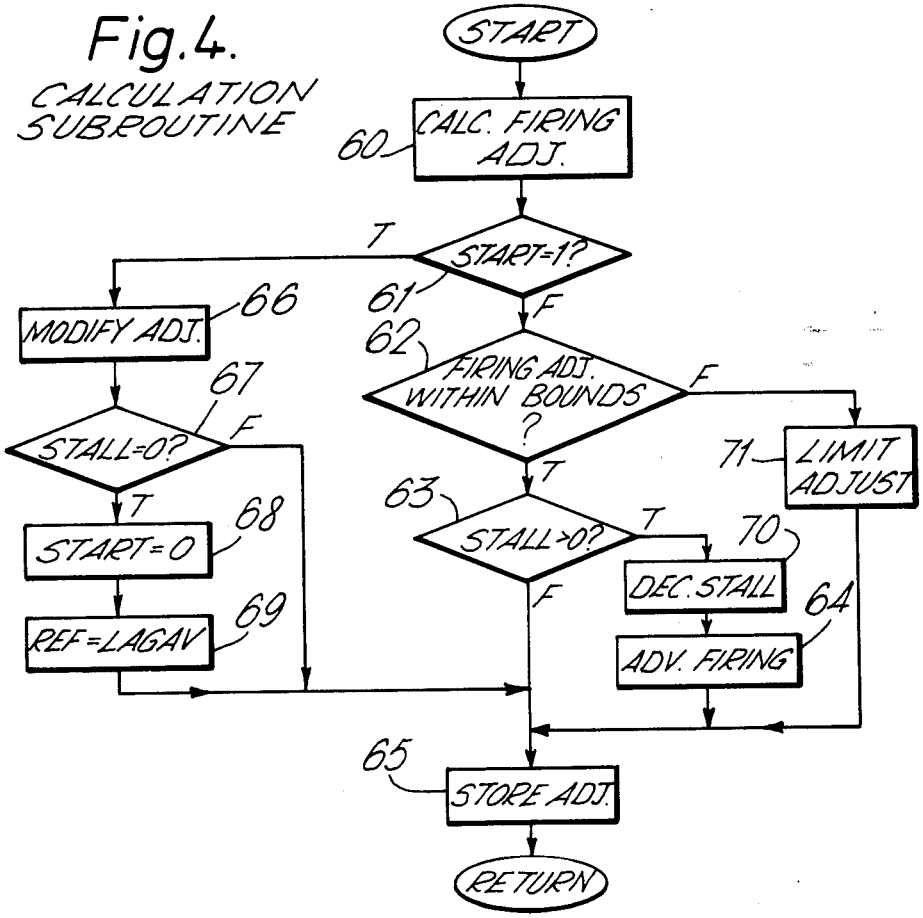
Figure 5:
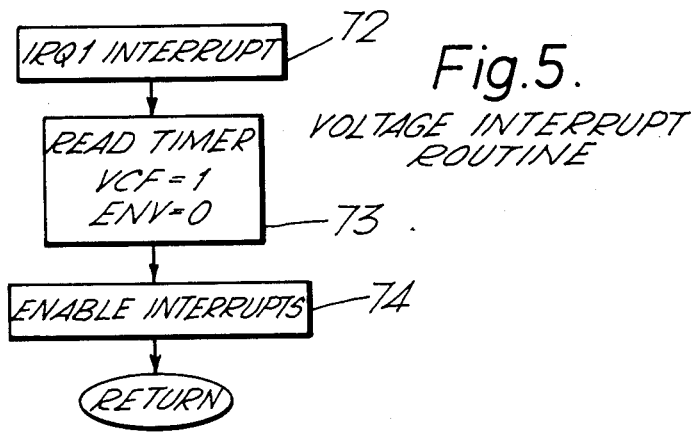
Figure 6:
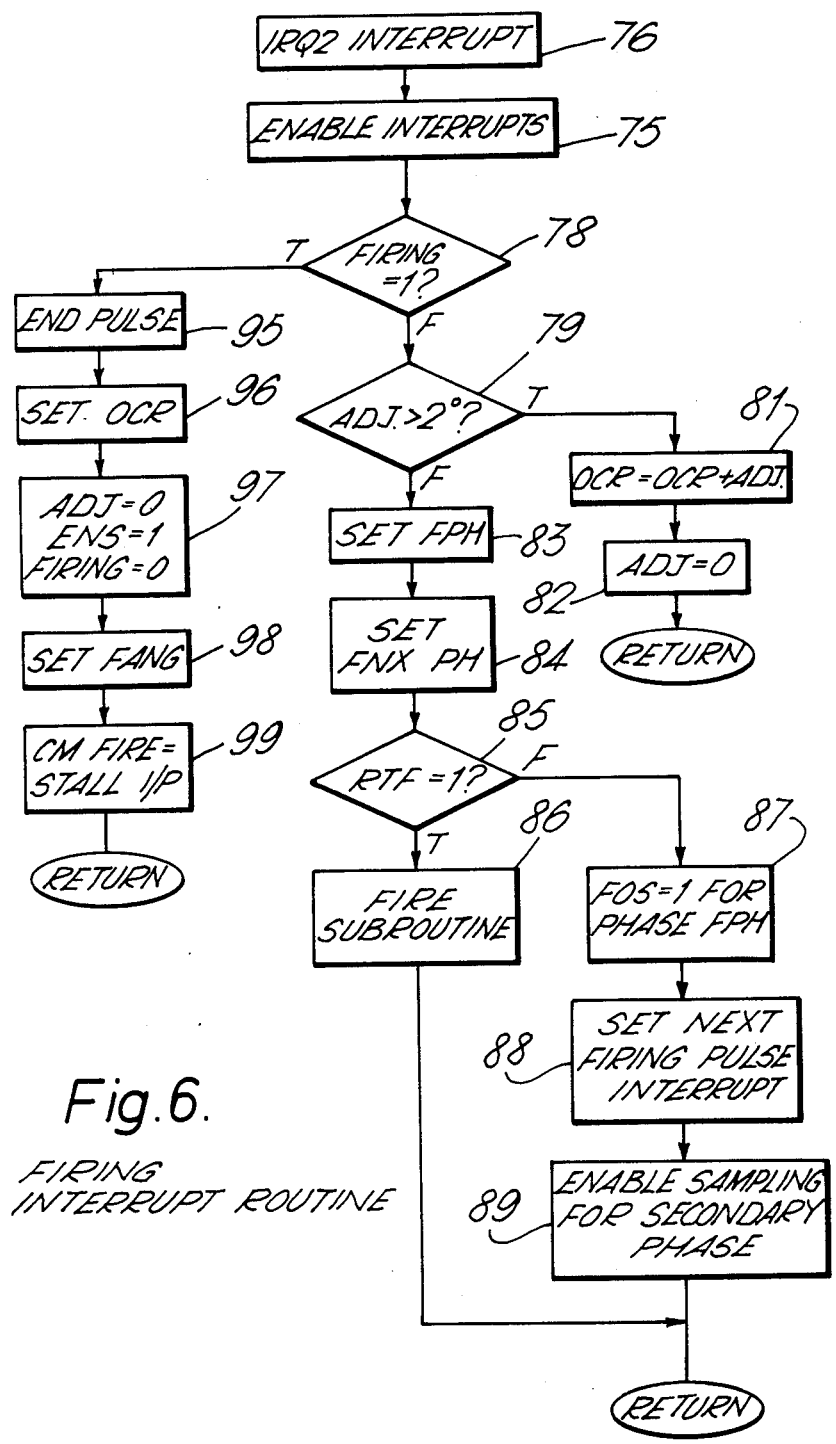
Figure 7:
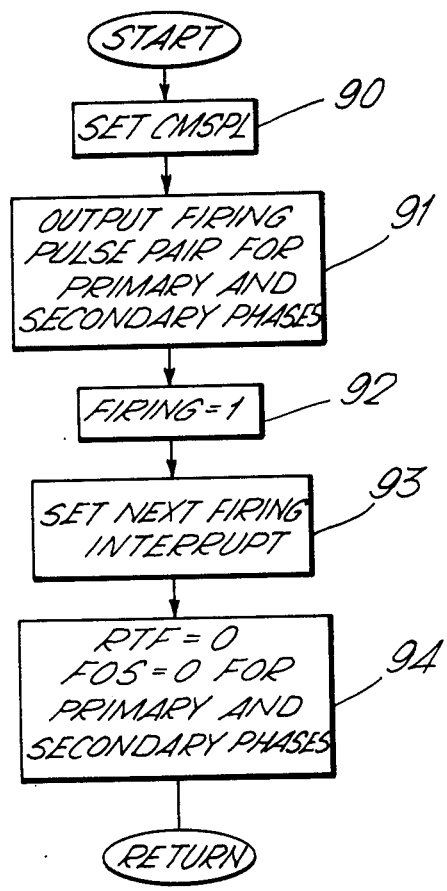
Figure 8A:
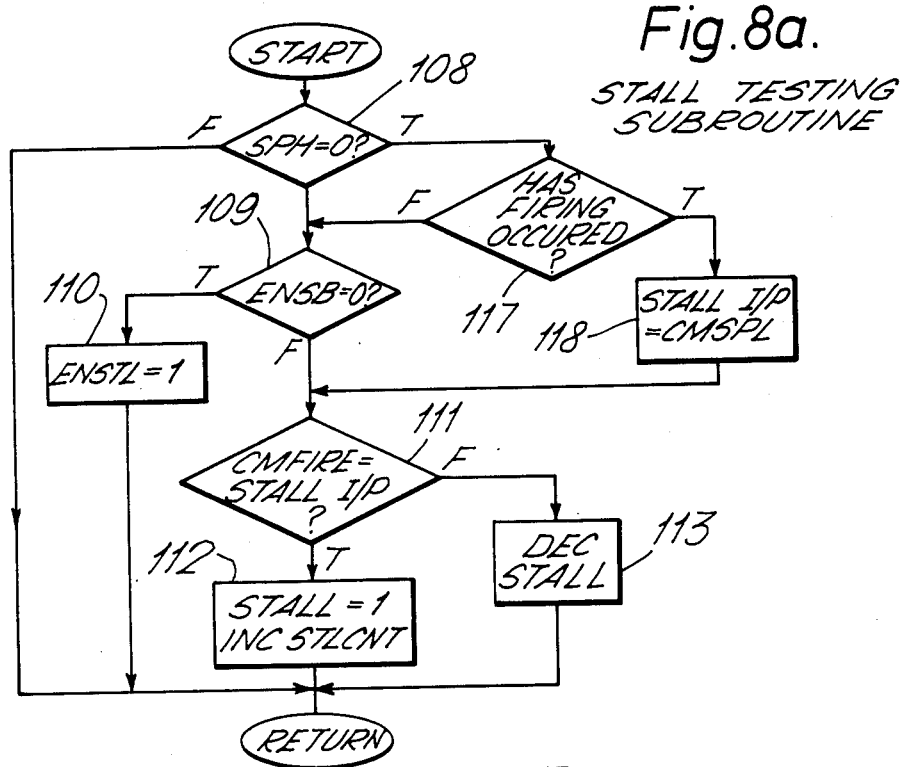
Figure 9A:
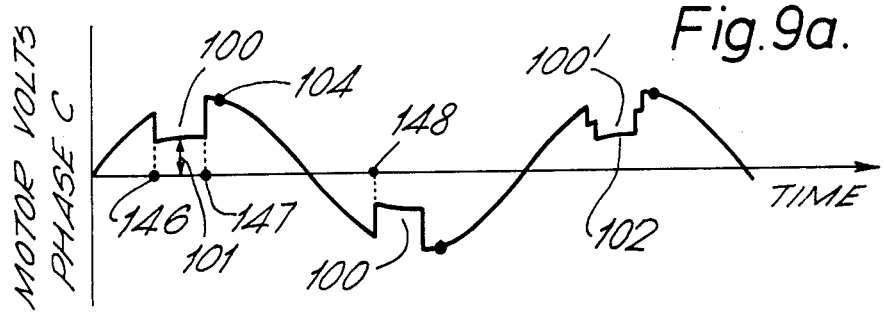
Figure 9B:
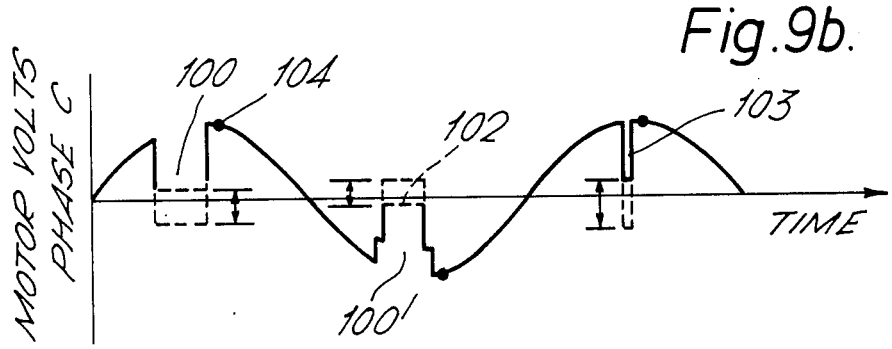
Figure 11:
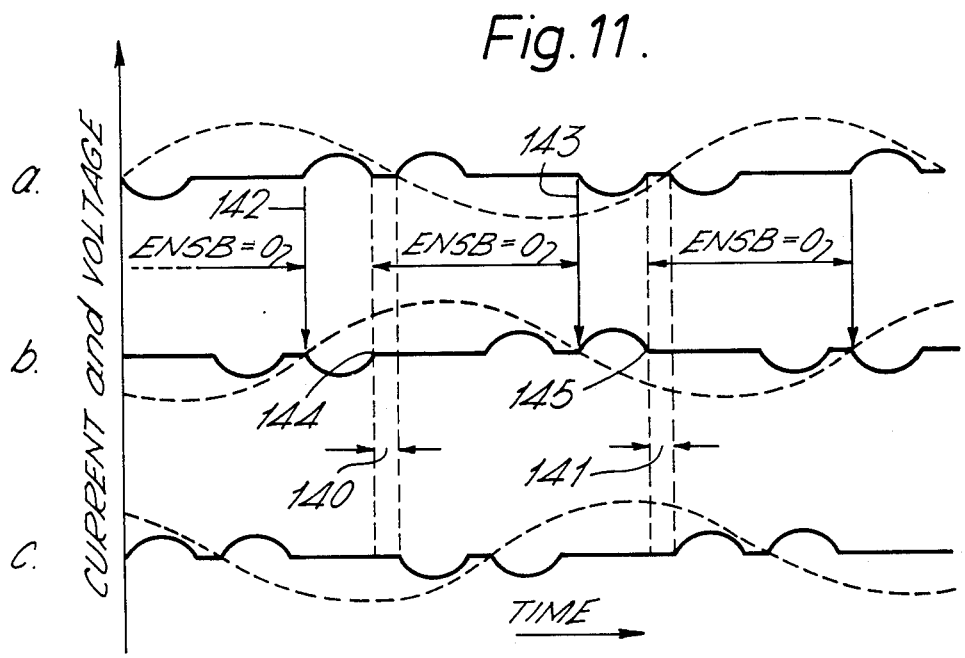
Figure 10A:
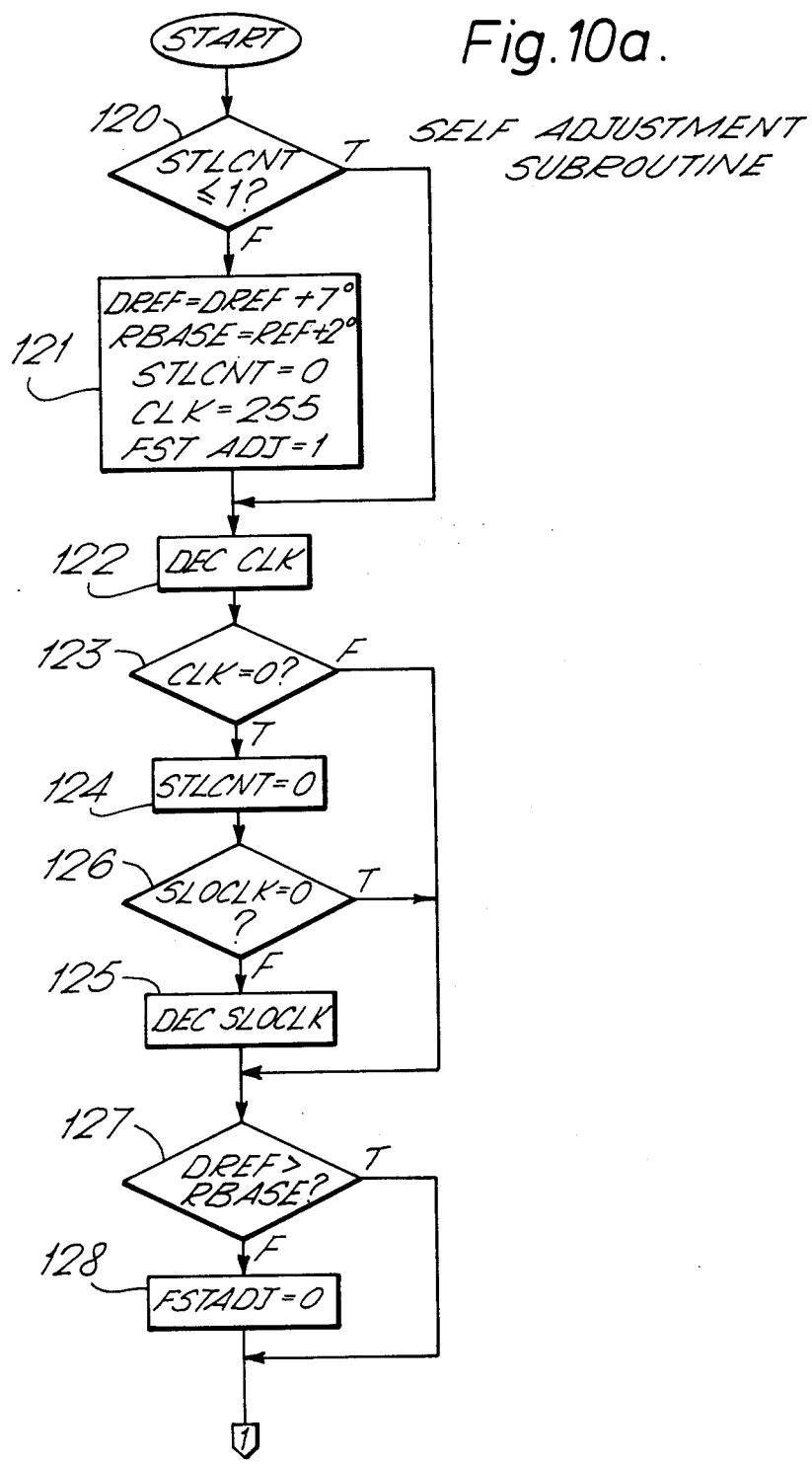
Figure 10B:
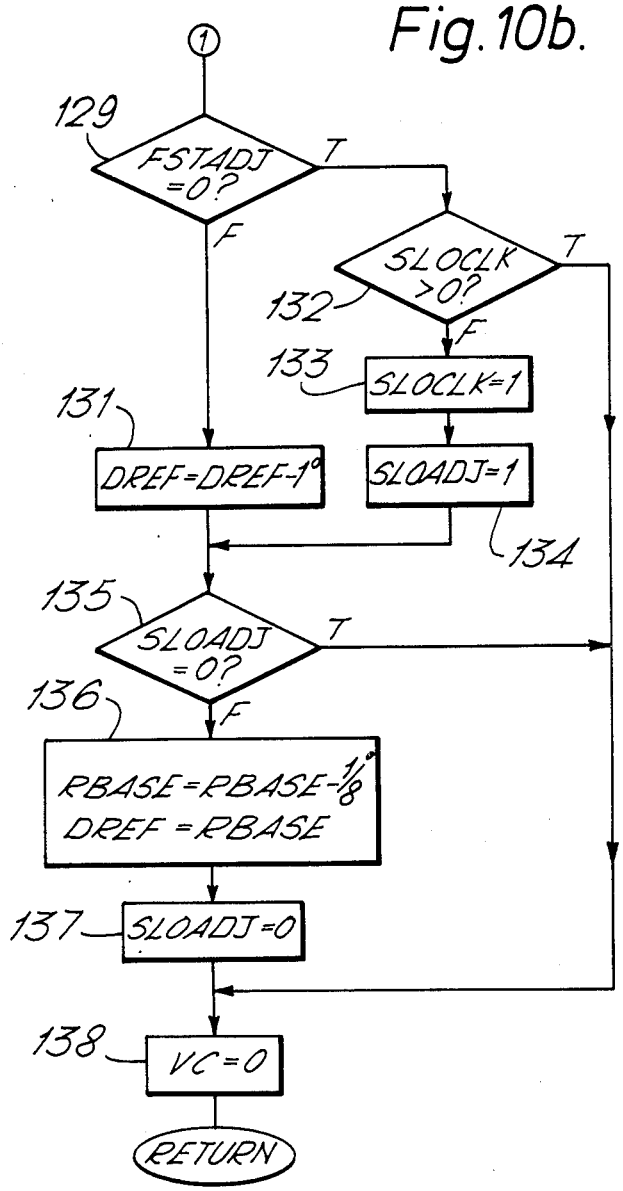
Figure 12:
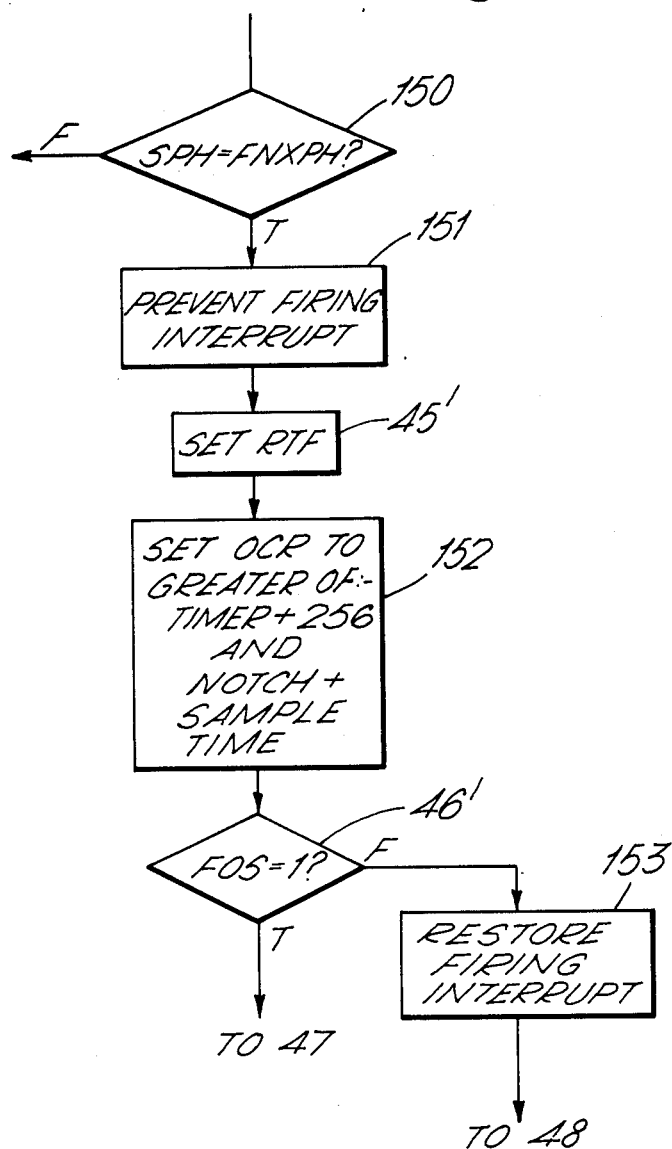
Figure 13:
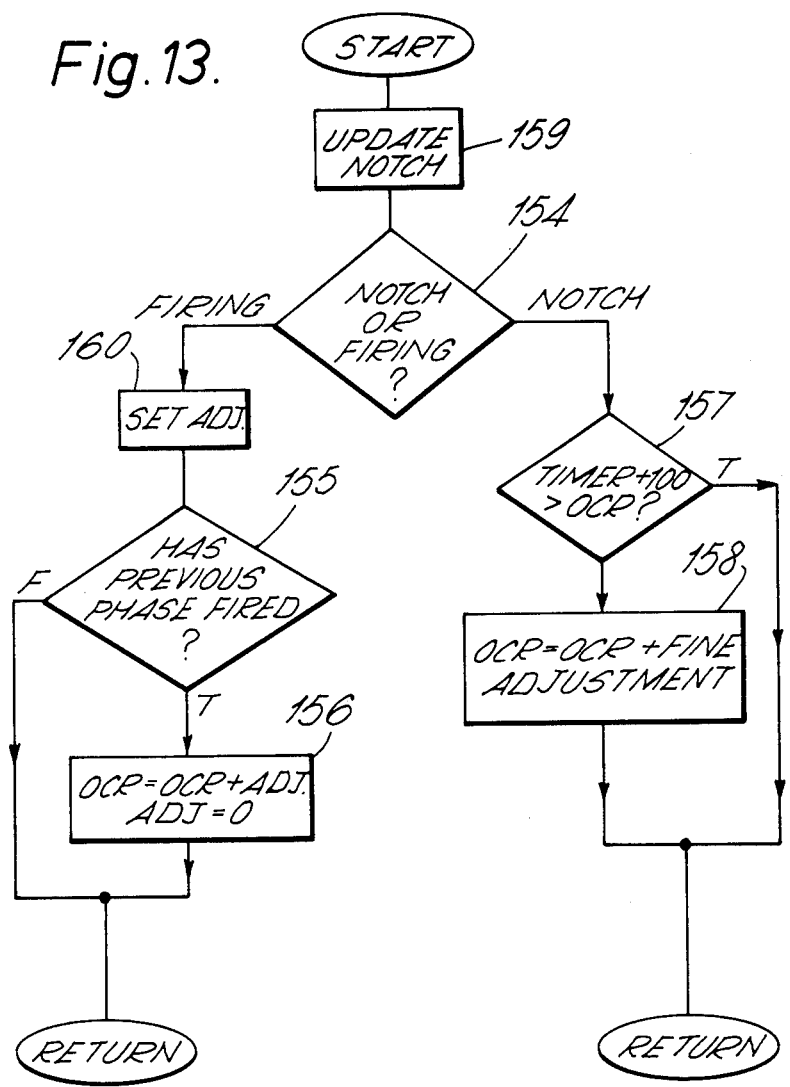

An embodiment of the invention will now be described by way of example, with reference to the accompanying drawings, in which:

FIG. 1 is a block diagram of a controller according to the invention,

FIG. 2 is a flow diagram showing the main program loop for the microprocessor of FIG. 1, FIG. 3 is a flow diagram of a sample subroutine shown in FIG. 2, FIG. 4 is a flow diagram of a calculation subroutine shown in FIG. 3, FIG. 5 is a flow diagram of a voltage interrupt routine, FIG. 6 is a flow diagram of a firing interrupt routine, FIG. 7 is a flow diagram of a firing pulse subroutine shown in FIGS. 3 and 6, FIGS. 8a and 9b are stall testing subroutines for tests shown in FIGS. 4 and 2, respectively, FIGS. 9a and 9b are composite waveform diagrams for phase C of a supply voltage for the controller of FIG. 1, FIGS. 10a and 10b are a flow diagram of a self-adjustment routine shown in FIG. 2, FIG. 11 shows phase current and phase voltage waveforms under some load conditions and is used in explaining when stall testing may be carried out, FIG. 12 is a flow diagram of a preferred addition to FIG. 3, and FIG. 13 is a flow diagram of a routine which may follow a subroutine 34 of FIG. 2.

In FIG. 1, respective pairs of parallel connected thyristors 10 and 11 are connected in series with the phases C, B and A of a three phase induction motor (not shown) in any of the ways shown for the triacs in FIGS. 3a to 3d of Application No. 8129044 published under the number 2084360. Other switching means may be used as an alternative for the thyristors; for example each thyristor pair may be replaced by a triac. Respective current sensing circuits 12 are connected across the thyristor pairs with outputs connected to NAND gates 14, 15 and 16 which in turn have outputs connected to a NOR gate 17.

As explained in Application No. 8129044, when a thyristor connected in series with the winding of an induction motor ceases conduction, the voltage between its anode and cathode rises to a value which is determined by the back e.m.f. of the motor. When the current in the phase ceases the voltage at the output of the appropriate current sensing circuit falls giving an indication from which current lag behind voltage can be determined. Thus when current in a phase ceases, the voltage at the corresponding current sensing circuit falls and provided the appropriate NAND gate 14, 15 or 16 is enabled a positive output appears at the output of the NOR gate 17. The NAND gates 14, 15 and 16 are enabled at times determined by a microprocessor 18, as will be explained later, by means of a connection from terminals 0, 1 and 2, respectively, of a port $P_1$. The microprocessor 18 may be a Motorola type 6801. The current sensing circuits may each comprise a rectifier, opto-isolater and a Schmitt trigger circuit as shown in Application No. 8312938 published under the number 2,120,422.

The supply side of the thyristors 10 and 11 in phase C is connected to a NAND gate 20 with output connected to an external interrupt terminal IRQ1 of the microprocessor 18 to cause the microprocessor program to be interrupted each time the supply voltage waveform for phase C goes negative; that is each time the output of the NAND gate 20 goes positive. To ensure that spurious signals do not cause an interrupt, the AND gate 20 is enabled at appropriate times (as is explained later) by a signal from the port $P_2$, terminal 2, of the microprocessor 18. A resistance-capacitance smoothing circuit (not shown) of time constant calculated to remove waveform spikes is connected at the input to the NAND gate 20. The capacitor is shunt connected to earth and so the voltage applied to the gate 20 is line-to-neutral.

When one of the thyristor pairs 10 and 11 is to be fired, a voltage appears at one of terminals 5, 6 or 7 of the port $P_1$ and firing pulses are applied by way of one of firing circuits 21 to 23 to the required thyristor pair. The firing circuits 21 to 23 may comprise an operational amplifier and an isolating transformer with a secondary winding for each thyristor as shown in application No. 8312938.

In order to indicate stalling the motor side of the thyristors 10 and 11 in phase C is connected (if required by way of an inverter (not shown)) to a terminal 3 of the port $P_1$. As is explained later, when the thyristors of phase C are off and the voltage on the motor terminals falls to zero or below it is an indication of stalling since while stalling the motor does not generate a back e.m.f.

A brief outline of overall operation is now given. The microprocessor 18 cycles continually around a main loop shown in FIG. 2 but if current in a phase ceases, as sensed by one of the sensing circuits 12, a jump occurs to a sample subroutine shown in FIG. 3. Here the present phase lag is calculated and a load-dependent offset from a reference firing angle is calculated, together with any required adjustment for the firing angle. On return to the main loop a self-adjustment routine to vary the basis of the offset is carried out to achieve optimum energy saving.

As has been mentioned, calculation of present phase lag depends on the time of occurrence of negative going zero crossings in the supply voltage and such crossings as sensed by the gate 20 cause a voltage interrupt which reads an internal timer in the microprocessor. Firing pulses are generated as follows: when firing pulses are applied to the thyristors an output compare register (OCR) is set to a value which corresponds to a further 60° of rotor rotation and when the timer reaches the value set in the OCR, a firing interrupt occurs. If there is any adjustment of phase angle to be carried out it is now made by resetting the OCR and the program returns to the main loop. When the OCR value again equals the timer value the firing interrupt re-occurs and if there is no further firing angle adjustment, firing pulses for the appropriate thyristors are initiated. The OCR is then set to the time at which the firing pulses are to cease and by means of another interrupt the firing pulses are terminated.

In the main program loop (FIG. 2) a number of variables are initially set to values which will allow a soft start for the machine and provide information necessary for starting the program (operation 30). The order in which phases fire is determined by the rotation sequence of the supply phases. During initialisation flags and variables are set to ensure that thyristors are fired in the correct order and account is taken of the direction of rotation in making tests and measurements used in the microprocessor program. The subjects of rotation, firing order and how it is achieved are described in Applications Nos. 8129044 and 8312938.

After initialisation, a test 31 is carried out to see if a voltage control flag (VCF) is set to 1 indicating that the voltage interrupt routine has occurred, and that the time (TIRQ) at which the last voltage negative going zero crossing occurred is available. The period of the supply voltage is now calculated from the last two such times in an operation 32 and timer values corresponding to 60°, 180°, 300° and 360° from the last zero crossing are calculated and stored for further use. In addition in operation 32 the VCF flag is reset to zero. Following operation 32, or the test 31 if the result of this test was false, a test 33 is carried out to determine if an input capture flag (ICF) is set to 1 indicating that current in a phase has ceased. Assuming that ICF equals 1, the sample routine of FIG. 3 which is described in more detail below, is now carried out in operation 34. Following the sample subroutine there is a comparatively long interval available before the next indication of current cessation so several operations can be carried out: the self-adjustment routine 37 shown in FIGS. 10a and 10b which is described below; and operation 35 in which the microprocessor tests a number of control switches to determine whether operation should be in the manual mode where the reference angle is set manually or the automatic mode where the reference angle is continuously optimised; and an operation 36 in which a simple display is operated to show whether the machine is stalling, on the point of stalling or not stalling. In spite of the length of the interval it may not be sufficient to allow all these operations to be carried out in every main program loop, so a variable VC is used to operate a test 41 which cyclically selects one of three routes to operation 35 or 37 or to a test 38. VC is set to 1, 0 and −1 in the operations 33, 37 and 35, respectively, to operate the cyclic selection. If the test 33 indicates that a current zero crossing has not occurred then there is a jump from the test 33 to the test 38.

If the timer value is now greater than 300° as calculated in the operation 32 as indicated by the test 38 an enabling signal for the gate 20 is applied to the terminal 2 of the port P$_2$ (operation 39) so that a further voltage interrupt can occur. An operation 40, described below, is now carried out to determine whether stalling has occurred and then the main program loop returns to the test 31.

The input capture flag ICF is set by the microprocessor hardware independently of any other microprocessor operations when the current ceases in a phase and as a result the terminal 0 of the port P$_2$ goes positive. The time at which current cessation occurred is stored as a variable TS. When the main program loop then reaches the test 33 the sample subroutine of FIG. 3 is called in the operation 34, and a test 42 is carried out to determine whether the positive signal on the terminal 0 of the port P$_2$ is still present. If it is not, indicating that the positive signal which occurred was due to noise or another spurious cause there is an immediate return to operation 35 of FIG. 2. If the positive signal is still present an operation 43 is carried out to remove the enabling signal applied to that one of the gates 14, 15 and 16 which operated the gate 17 so that further samples cannot occur until an appropriate gate is again enabled. Using a variable SPH set as will be described in an operation 54 to indicate the phase next expected to indicate current cessation, a test 44 is carried out to determine whether cessation occurred in the phase expected, or if for some reason the expected cessation has not occurred or has not triggered the sample subroutine.

If the sample was as expected, a ready-to-fire flag (RTF) is set in an operation 45 to indicate that the phase which generated the sample has ceased conduction and is now ready to be fired again. In some circumstances a phase has to be fired as soon as it has ceased conduction and when this is so a flag fire on sample (FOS) will already have been set to 1. The test 46 determines whether this flag has been set and if so a jump to the firing pulse subroutine (FIG. 7) occurs.

Following false outputs from the test 46 and following the firing subroutine, the time of the voltage-zero for the phase which has just ceased conducting is updated (in an operation 48) by adding the equivalent of 60° to a variable TVC which held the voltage crossing time of the previous phase. The microprocessor calculates zero crossing times for each voltage phase in this way from the previous zero crossing time, since only negative going reference zero crossings in the C phase are measured by the voltage interrupt routine. Once per cycle these reference voltage zero crossing times are updated by comparing the actual crossing time TIRQ of phase C with the calculated expected time $T_6 = T_o + 6N$, where N is the current value for the 60° period and $T_o$ and $T_6$ are the time of the previous and next calculated zero crossings. Then $$NCORR = TIRQ - T_6$$

giving
N=N+NCORR/32, and
$T_o=T_6+$NCORR/4.
Division by 32 and 4 provides damping.

This technique allows fluctuations in mains frequency to be followed and allows the controller to adjust to a mains frequency of 50 or 60 Hz.

A test-for-stalling subroutine 50 is now carried out to determine whether there has been any tendency to stalling and if so the subroutine 50 provides a stall count for use by the self-adjustment routine 37. The subroutine 50 is described below. The operation following the stalling test subroutine 50 is one of calculating a load dependent offset for the reference angle (operation 52) but since this operation depends on the outcome of the self-adjustment routine 37 of the main loop it is described below when the operation 37 is described in more detail.

In an operation 53 the present phase lag (a variable LAG) is calculated by subtracting TS the time of occurrence of the cessation of current which triggered the sample routine from the time at which the last voltage zero crossing in the same phase occurred, as calculated form the variable TVC.

In an operation 54 a variable SPH is set to indicate the next phase expected to provide a current sample. Unless the present sample was unexpected as indicated by a test 55 the calculation subroutine of FIG. 4 (described below) is now run in operation 56 before the sample subroutine returns to operation 35 of the main program loop (FIG. 2).

Following a false output from the test 44 a subroutine 49 comprising operations 48 to 56 is carried out and then the test 44 is repeated.

The stall testing subroutine 50 used in the sample subroutine is now described. FIG. 9a shows the phase voltage at the motor terminal of phase C as applied to the terminal 3 of the port $P_1$ of FIG. 1. This voltage follows a sinusoidal waveform except where notches 100 occur and the notches indicate when the thyristors for phase C are switched off. The voltage does not normally fall to zero within the notches because the motor generates a back e.m.f. 101 but the notches can be either as shown at 100 or at 100' depending on the load on the motor. Thus FIG. 9a does not show an acutal motor voltage waveform but a composite waveform which illustrates the two types of notches. The notches 100' have an initial shoulder which occurs when all three phases are off, an interval 102 when one phase only is off and a further final "shoulder" when all three phases are again off.

When stalling occurs the phase C motor voltage has one of the waveforms shown by the composite waveform of FIG. 9b which illustrates three different conditions. Since under stall conditions the motor generates no back e.m.f., the voltage in the notch 100 falls below zero (pulled by the other two supply phases). However in the notch 100' the voltage is only zero during the time 102 when one phase only is off. An example of a very narrow notch which occurs during starting is shown at 103 and its significance will be explained later. The detection of stalling depends on observing the back e.m.f. during notches. A variable CMFIRE is set during the firing routine of FIG. 6 (operation 95) just after phase C has been fired when the motor phase voltage equals the supply voltage. CMFIRE is set from the terminal 3 of the port $P_1$ and since it is positive at the time 104 for example, a stall will be indicated if the voltage in the next notch is also of the same polarity, that is positive. CMFIRE is set to "1" if the voltage sensed is positive and to "0" if not. Care has to be taken to ensure that where a notch of the type 100' occurs the voltage within the notch is taken during the interval 102 and not during one of the notch shoulders.

The operation 50 of the sample subroutine (FIG. 3) has the form shown in FIG. 8a and detects stalling when notches have the form shown at 100 in FIGS. 9a and 9b. Should the other type of notch (100') occur then the operation 40 of the main program loop (FIG. 2) is used and the subroutine for the operation 40 is shown in FIG. 8b.

In FIG. 8a a test 108 determines whether the waveform sample is from phase C, this being indicated by the variable SPH set in the operation 54 of FIG. 1 being equal to zero. Since stalling is only checked on phase C, if the test 108 is false then a return is made immediately to operation 52 of FIG. 3. If the test 108 is true then following a test 117 which is explained below, a test 109 is carried out to determine whether current waveform sampling in phase B is inhibited. If ENSB equals zero then sampling in phase B is inhibited and this is an indication, as is explained below, that the notch may be of the type 102. Thus if the test 109 is true, stall detection cannot take place as yet and for this reason a variable ENSTL is set to 1 in an operation 110 which enables the subroutine of FIGS. 8b to test for stall during a notch 102. On the other hand if the test 109 is false then a test 111 determines whether the voltage at the terminal 3 of the port $P_3$ is positive or negative and therefore of the same polarity as represented by CMFIRE. If so stalling has occurred and a variable STALL is set to 1 and a further variable STLCNT is increased by one in an operation 112. In the calculation subroutine the variable STALL is used to advance the phase of the firing angle by 3° and it is decremented by one each time such an advance is made (see operations 64 and 70 of FIG. 4). If the test 11 indicates that no stalling has occurred then the variable stall is immediately decremented (operation 113) towards zero.

Figure 8B:
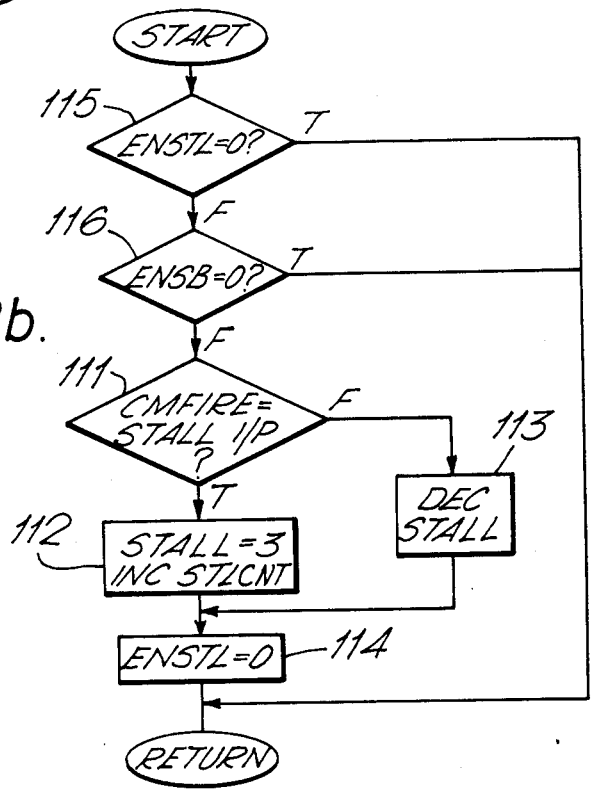

To follow through the setting of the variable STALL and STLCNT when notches of the type 102 occur, the operation 40 of the main loop as shown in FIG. 8b is now explained. If the variable ENSTL has been set to 1 as in the operation 110 of FIG. 8a, then a test 115 is false and stalling detection ensues provided that a test 116 shows that the variable ENSB is not now equal to zero. If either tests 115 or 116 are true then there is a return to the main program loop. That part of FIG. 8b following a false output from test 116 is similar to that of FIG. 8a except that the variable ENSTL is set to 0 in an operation 114 following either operation 112 or 113.

When the notch is narrow as shown at 103, the fire subroutine may have run at operation 47 of FIG. 3 so that when the test 11 is carried out, the voltage waveform has passed the notch. For this reason a test 117 is carried out which determines whether the FPH=0 indicating that a firing pulse has been applied. If so, by means of an operation 118, the test 111 determines whether CMFIRE equals CMSPL which is a variable set immediately before firing in an operation 90 of the firing pulse subroutine (FIG. 7) to represent the polarity of the phase C motor voltage waveform just before firing, that is within the notch 103.

The basis of the inhibition of the test 50 (FIG. 3) for stalling if all three phases may be conducting is now explained. If will be recalled that inhibition occurs if the variable ENSB (enable current sampling in phase B) is zero. The waveforms a, b and c shown in solid lines in FIG. 11 show currents in phases C, B and A, respectively, under certain load conditions, and the waveforms shown in dashed lines are the corresponding supply voltage waveforms. These waveforms are similar to some of the waveforms shown in Application No. 8129044 where they are explained in more detail. The current waveforms a, b and c show periods 140 and 141 when current has ceased in all three phases, and it is these periods when a voltage from phase C would lead to a false indication of stalling (that is the notches are of the type 100').

Since the variable ENSB becomes one, when phase C is fired in operation 93 of the firing interrupt routine of FIG. 6, at times 142 and 143 (FIG. 11) and reverts to zero at times 144 and 145 in the operation 43 of the sample subroutine (FIG. 3), it is clear that by testing the voltage of phase C only when ENSB=1 (tests 109 and 116 of FIGS. 8a and 8b), testing is not carried out when all three phases are conducting.

The self-adjusting subroutine shown in FIGS. 10a and 10b can now be described since the way in which the variable STLCNT is incremented each time a stall action takes place has been explained. If, according to a test 120, STLCNT is less than or equal to one then the stall may be due to a temporary condition and no adjustment of the reference angle is made. On the other hand if STLCNT is one or more then an operation 121 is carried out in which a variable DREF is increased by a count equivalent to 7° of rotor rotation. As will be explained later DREF is used in calculating an offset to the reference angle in such a way that its value amounts to a permanent offset under stable conditions between the firing angle and the reference angle. When there is no tendency to stall indicating that a smaller offset can be tolerated for improved energy saving, DREF is made to progress towards zero in two stages, firstly at a fast rate also controller by a clock variable CLK and subsequently at a slow rate controller by a slow clock (SLOCLK). The changeover from the fast to the slow rates takes place when DREF equals a variable RBASE and in the operation 121 RBASE is also increased to a value equivalent to the reference angle pluse 2°. In addition, the operation 121 sets the variable STLCNT equal to zero, the clock CLK to 255 and a flag FSTADJ (indicating that fast adjustment is to take place) to one.

In an operation 122 which occurs once per mains cycle the fast clock CLK is decremented. The clock CLK therefore reaches zero in about 5 seconds and in this way the number of stall actions within 5 seconds is counted. When zero occurs and is indicated by a test 123 the stall count is set to zero in an operation 124. SLOCLK is decremented in an operation 125 (a test 126 prevents it having a negative value) and thus SLOCLK is decremented once every 5 seconds. If the variable DREF is greater than RBASE (test 127) then fast adjustment is to take place but otherwise an operation 128 sets FSTADJ to zero. If a test 129 shows that fast adjustment is to take place, DREF is decreased by the equivalent of one degree in an operation 131. Therefore if fast adjustemnt is required, DREF is decremented each time the main program loop is traversed and CLK is decremented. Should the test 129 indicate that fast adjustment is completed then SLOCLK is set to one. Following the operation 133 a slow adjustment flag (SLOADJ) is set to one in an operation 134. If a test 135 shows that slow adjustment is required then an operation 136 takes place in which RBASE is decreased by the equivalent of one-eighth of a degree and DREF is set to equal RBASE. Since SLOCLK and SLOADJ are only set to one when SLOCLK is zero and SLOCLK is only decremented (operation 125) when CLK=0, a slow adjustment is made every 5 seconds. Following this operation the slow adjust flag is set to zero (operation 137) and VCO is similarly set in an operation 138. If the test 135 is true then no slow adjustment is required and a jump occurs directly to the operation 138.

The variable STLCNT which gives the number of stalling actions in 5 seconds may be used as the basis of the display operation 36 of FIG. 2. A number of LEDs (not shown) may be switched on by the microprocessor 18 in accordance with the value of STLCNT.

The self-adjustment procedure may be disabled when the notch width is narrow corresponding to a heavy motor load since this procedure is intended to optimise conditions when the motor is lightly loaded.

Having described the self-adjustment subroutine 37 of the main program loop, the operation 52 of the sample subroutine (FIG. 3) can be described in more detail. The operation 52 modifies the offset variable DREF according to the load applied to the motor. As the load increases, the width of the notch in the voltage waveform (see FIG. 9a) decreases and vice versa. The notch width is measured for phase C only by finding the time 146 and subtracting the time 147 at which the firing pulse for phase C ceases as indicated by setting a variable FANG in operation 94 of the firing interrupt routine (FIG. 6). The time at which the notch starts is obtained by subtracting the equivalent of 180° from the variable TS at time 148, that is the time at which current in phase C ceases. Maximum possible notch width for minimum load is 60° and minimum notch width is 0°. Thus the required load dependent variable (ADJ2) at the output of the operation 52 is given by ADJ2=(DREF)×(notch width/60°)×(a scaling factor).

A suitable scaling factor is 2. Thus ADJ2 increases with notch width so that the offset between the reference angle and the firing angle is inversely proportional to motor load.

The calculation subroutine 56 (FIG. 3) for determining any required adjustment to firing angle can now be described in are detail since it employs the variable ADJ2. Initially an average value (LAGAV) for the lag of current behind voltage is calculated by averaging the current phase lag as found in the operation 53 of FIG. 3 with the previous value thereof. The remainder of the calculation subroutine is based on the second method of determining the required firing angle described in the above mentioned Application No. 8312938. Briefly in order to ensure stability of a motor controlled by the controller the error signal between the reference angle (REF) and the average phase lag (LAGAV) is filtered using a characteristic having a first region of integral response to the error signal and gain falling with increasing frequency, a second region of proportional response to error and constant gain independent of frequency, and a third region of differential response to error and gain rising with frequency. The second region extends between about 2 Hz and 9 Hz and the third region extends to about 130 Hz. The required response may be obtained by combining integral, proportional and derivative error signals to give the firing angle F. Thus $$F = g_I \int \frac{E_i dt}{\tau_o} + g_P E_i + g_D \tau_o \frac{dE_i}{dt}, \text{ where } g_I, g_P \text{ and } g_D \text{ are}$$

respective gain for the three regions and $E_i=$ LAGAV−REF.

When sampled at successive 60° time intervals $_o$ (sampling is carried out each time current in a phase ceases and the sample subroutine of FIG. 3 runs), the three terms lead to $$F_n - F_{n-1} = g_I \frac{E_{in}\tau_o}{\tau_o} + g_P(E_{in} - E_{in-1}) +$$

$$g_D\tau_o \frac{[(E_{in} - E_{in-1}) - (E_{in-1} - E_{in-2})]}{\tau_o},$$

referring to successive sampling intervals (n−1) and n. That is:

$F_n - F_{n-1} = E_{in}[g_I + g_P + g_D] - E_{in-1}[g_P + 2g_D] + E_{in-2}g_D$

This is the required adjustment to the firing angle calcuabe from the successive error signals $E_i$.

For ensured stability, $(g_P - g_D) = 2$, $g_D = 1 - 1.5$, and $g_I = 1/32$ or $1/64$. This has the effect over short times of keeping the non-conducting period (notch width) constant in the presence of the fluctuating loads, whilst the $g_I$ term adjusts the notch width and phase lag in response to load demand.

In this embodiment of the present invention the variable AJD2 as detersined by the operation 52 is added to the value of a variable ADJ representative of the required firing angle adjustment means $F_n - F_{n-1}$ so that ADJ becomes:

$$ADJ = (g_P + g_D)(E_{in} - E_{in-1})g_D(E_{in'1} - E_{in-2}) + E_{in}$$
$$g_I + ADJ2$$

It can be seen that under steady conditions when $E_{in} = E_{in-1} = E_{in-2} = E$ and $ADJ = 0$ $$0 = g_I E + ADJ2$$

that is $$E = -\frac{ADJ2}{g_I}$$

Thus the final error signal equals $-ADJ2$ divided by the gain $g_I$. Typically $g_I = 1/32$ and therefore an offset of thirty-two times ADJ2 is obtained under steady conditions between the reference angle and the phase lag. However since ADJ2 is dependent on DREF (the output of the self-adjustment routine 37), and motor load (via the notch width) the offset is steadily adjusted to suit the load conditions.

The calculation of ADJ (according to the above equation for ADJ) is carried out in an operation 60 in the calculation subroutine of FIG. 4 which is now described. Having calculated any firing adjustment required, a test 61 is made to determine whether the machine is being started or not as indicated by a START flag. If the flag is not set then a test 62 determines whether the firing adjustment which has been calculated is within bounds (that is within ±15°) and if so a test 63 is made to determine whether the variable STALL is greater than zero. If it is STALL is decremented (operation 70) and firing is advanced by subtracting 3° from ADJ in an operation 64 before ADJ is stored in an operation 65.

If ADJ is more than ±15° as indicated by the test 62, the adjustment to the firing angle would be too abrupt for smooth motor running. Therefore ADJ is limited to ±15° in an operation 71 and then stored in the operation 65.

The calculation subroutine of FIG. 4 includes a route by way of operations 66 to 69 which is adopted during starting. The first of these operations 66 modifies the calculation of the variable ADJ which is used to adjust the firing angle. This modifiction relates to the last two terms ($g_I E_{in}$ and ADJ2) in the above mentioned equation for ADJ which are replaced by the variable ADV. As was pointed out above under steady conditions ADJ equals the last term in the said equation. During steadily progressing starting, conditions are not truly steady since ADJ is being steadily changed but nevertheless with the last two terms of the equation replaced by ADV, ADJ becomes approximately equal to ADV. Thus if ADV is set to a value equivalent to say 1° when the notch narrows by 6° for each mains cycle, that is by 1° per firing. A slower soft start can be obtained by arranging that during starting a variable ADV is only taken into account in calculating ADJ once per mains cycle. At other times it is zero so that the notch width is then held constant. The initial value of ADV is set manually by means of a HEX switch (not shown) connected to the microprocessor 18, the switch being read in the initialisation operation 30 of FIG. 2.

Following the operation 66, a test 67 is carried out to determine whether the motor is stalled. If it is not then this is an indication that starting is over and the START flag is set to 0 in an operation 68. Also the variable REF is set to the value of the variable LAGAV (operation 69) so that normal operation can be carriedout. REF remains at this value while the motor remains on, and thus the reference value is automatically selected each time the motor is run. If the test 67 indicates that the motor is still in a stall condition operations 68 and 69 are bypassed.

Alternatively, a more strongly smoothed value of the phase lag may be used to obtain the REF value so reducing the effect of flutuation in phase lag. For example REF may be set to a variable LAGSM where $$LAGSM = x\ LAG + (1-x)\ LAGSM,$$

the value of x used is small e.g. $\frac{1}{8}$, 1/16

As has been mentioned calculations of phase lag and times at which thristors are fired are determined from an interrpt which occurs when the voltage in the supply phase C crosses zero going negative. In FIG. 5 such a crossing indicated by the output of the gate 20 (see FIG. 1) causes and IRQ1 interrupt to occur (operation 72) and this is followed by an operation 73 in which the microprocessor timer is read, the flag VCF is set and ENV the signal enabling the gate 20 from the terminal 2 of the port P2 is set to zero. This is followed by an operation 74 when interrupts are enabled.

The way in which the thyristor pairs are fired is now described in more detail. When the internal time of the microprocessor reaches the value held by the output compare register (OCR), an IRQ2 interrupt occurs (operation 76 of FIG. 6) and is followed by an enable interrupts operation 75. Should the IRQ2 interrupt occur duing a firing pulse then test 78 will be true but assuming that it is false at this stage, a test 79 is carried out to determine whether the variable ADJ calculated in operation 60 of FIG. 4 corresponds to an angle greater than 2°. If so then the value of the register OCR is increased by adding the value of the variable ADJ in an operation 81 and then the variable ADJ is set to zero and a return occurs to the main loop or one of its subroutines.

If the test 79 indicates that no appreciable adjustment needs to be made then a firing mask FPH for the phase which is to be fired is set in an operation 83. Each time FPH is set a variable FNXPH is incremented (operation 84) so that FPH can next be set in dependence on FNXPH according to the phase which is to fire. If a test 85 indicates that the phase to be fired is ready to fire, that is RTF as set in the operation 45 of FIG. 3 equals one, then the firing subroutine of FIG. 7 is run in an operation 86. Should, for example, the phase to be fired still be conducting then the false output of the test 85 leads to an operation 87 where a flag fire on sample (FOS) is set to 1.

An operation 88 follows in which the output compare register (OCR) is set to a time equivalent to 60° on so that the next IRQ2 interrupt would occur at that time. Normally, however, as will be seen later OCR is reset by the firing pulse subroutine (FIG. 7) in an operation 92 during and at the end of firing. Setting OCR at this stage is a safety precaution. For the same reason one next phase is made ready for current sampling in an operation 89 by applying an enabling signal to one of the terminals 1, 2 or 3 of the port $P_1$.

Thyristors are fired if a test 46 for FOS=1 is true and when the test 85 in FIG. 6 (RTF=1) is true. On these occasions the firing subroutine of FIG. 7 is carried out. Initially in the operation 90 the voltage at the phase C motor terminal (terminal 3 port $P_1$) is used to set a variable CMSPL which indicates whether the motor terminal is positive or negative and is used as explained above to detect stalling when the notch is narrow. In an operation 91 outputs are applied to two of the terminals 5, 6 or 7 of the port $P_1$ selected according to the phase which is to be fired and also according to a secondary phase to be fired at the same time. The reason for firing a secondary phase is explained in Application No. 8129044. Briefly under some load conditions current ceases in all phases and if only one phase is fired no complete current path will exist through the motor. Choice of secondary phase is also explained in Application No. 8129044 and depends on direction of motor rotation. An operation 92 then sets the variable FIRING to 1 and in a next operation 93 the next firing interrupt is set to occur at the current value of the register OCR plus the required firing pulse width. The variables RTF and FOS are now set to 0 for both the primary and secondary phases in an operation 94 before a return occurs.

If the test 78 indicates that a pulse has already commenced then an operation 95 is carried out in which voltages applied to selected terminals in the port $P_1$ by the fire subroutine 86 are removed. Next, in an operation 96, the register OCR is set for the next firing interrupt and it is here that any further adjustment is taken into account. OCR is set to equal its previous value+60°+ADJ−(the width of firing pulses). The variable ADJ is now set to zero; sampling in the secondary phase is enabled by applying a signal to one of the terminals 1, 2 or 3 of the port $P_1$ since the secondary phase is the next phase in which current ceases; and as an indication of the end of firing the variable FIRING is set to zero (operation 97). As is explained in Application No. 8129044, it is necessary to inhibit current sampling during certain periods. Briefly, under some load conditions, current in one phase ceases because the current in the other two phases has ceased and there is no current path through the motor. Such a cessation in current would give a false value if used in a phase lag calculation as it is inhibited. In the present embodiment inhibiting is carried out by passing enabling signals (ENS) to one of the gates 14, 15 and 16 of FIG. 1 only when current cessation in the corresponding phase will give a correct phase lag indication.

In order that the time at which the end of firing occurs is available for calculating the load, a variable FANG is set to the time held by the microprocessor internal clock in an operation 98 and in order to determine, in some circumstances, whether stalling is occurring, as described above, the variable CMFIRE is set if it is phase C that has just been fired. If the motor voltage for this phase is positive as applied to the terminal 3 of the port $P_1$ CMFIRE is set to one but if the voltage is negative it is set to zero (operation 99).

Transient conditions such as supply or load variations may cause a firing pulse to be generated early or late and when this occurs it is important to keep motor speed stable so that the notch 100 or 100' in FIGS. 9a and 9b is maintained at approximately its previous width. However the portion of the sample subroutine (FIG. 3) from the beginning of the operation 45 to the end of the operation 53 requires a time which may not be sufficient to allow a firing signal to be initiated quickly enough to keep the notch width approximately constant when a firing signal occurs early. For this reason it is preferable to insert a test 150 (see FIG. 12) between the test 44 and the operation 45 of FIG. 3 to determine whether the normal or "firing adjustment" mode of the firing phase angle or a "notch adjustment" mode is adopted. If the variable SPH which indicates the phase just sampled equals the variable FNXPH then it is an indication that the current notch is as shown at 100 because the next phase to fire is the one which has just provided the current sample. Thus if the test 150 is true then immediate action is required to set the register OCR so that the notch has approximately its previous width and the notch adjustment mode is used. If the test 150 is false the firing adjustment mode is used and a jump to operation 45 in FIG. 3 occurs.

In order to prevent firing occurring while notch adjustment is carried out an operation 151 disables the firing interrupt IRQ2 and then the RTF flag is set in the operation 45' followed by an operation 152 in which the OCR is set to the greater of the current internal-timer value plus 256 or a variable NOTCH (representative of notch width) plus the time at which the last current sample occurred. Since the notch width may be very small the timer may reach the latter possible value for OCR before or during operations 150 to 153 (when the firing interrupt is restored) and to allow for this the former value for OCR provides a very narrow minimum notch width which is always acceptable.

Before the operation 153 a test 46' is carried out to determine whether the fire on sample flag is set and if so the fire subroutine 47 is followed. If the flag is not set the operation 153 occurs and then a return is made to the beginning of the operation 48 so that following through the sample subroutine of FIG. 3 a further correction of OCR can be made after the calculation of subroutine 56 if the phase which initiated the last sample subroutine has still not fired. Firing initiated by IRQ2 may now occur if the timer value reaches the value of the OCR.

In the notch adjustment mode, the variable NOTCH is updated in an operation 159 described below in connection with FIG. 13 and used to control the setting of the OCR to control the firing times. In the firing adjustment mode, where firing is adjusted in response to the variable ADJ (operation 156 of FIG. 13 and operation 96 of FIG. 6), NOTCH is adjusted at the end of the firing pulse for phase 0 that is (FPH=0) after the operation 98 using NOTCH=FANG−sample time TSO (time of current zero in phase 0 (SPH=0) which has previously been stored). This, together with the operation 159, ensures that NOTCH always has the correct value.

Thus if the preferred method of FIG. 12 is adopted then following the sample subroutine 34 in FIG. 2 one of two different adjustment subroutines is carried out: a first when the normal or firing adjustment mode is adopted and a second when the notch adjustment mode has been followed. In these two subroutines an immediate adjustment is made to the value of OCR if there is time before firing occurs in the phase which provides the sample. In this way an instability problem is overcome since if a firing angle adjustment is made for one phase which is determined from the phase lag in another phase, then a sudden change in firing angle in the other phase may lead to instability but by making, wherever possible, an immediate adjustment which will affect the firing pulse of the phase which initiated sampling, this instability is avoided. When immediate adjustment is carried out in this way the test 79 and the operations 81 and 82 of FIG. 6 are omitted.

Before discussing the immediate adjustments of the variable OCR following the calculation subroutine 56, a preferred algorithm for calculating ADJ is described. This algorithm may replace that mentioned above in the operation 60 of FIG. 4 and has the advantage that it also leads to greater motor speed stability. In the preferred algorithm the variable has three terms: firstly a term which keeps the notch width approximately constant and it equals the present error in phase lag minus the previous error; secondly a fine adjustment term which is equal to the present error divided by a number which sets the degree of the fine adjustment; and thirdly the load dependent offset ADJ2 which also depends on the tendency to stall. In order to improve stability the fine adjustment term should be greater when the phase error is worsening and be smaller when the phase error is lessening. The sign of the phase error is apparent from the sign of $E_o$ (where $E_o = LAG - REF$ that is phase error for the phase which Provided the latest current sample) and the sign of the rate of change is obtained by subtracting $E_3$ (that is the previous error for the phase under consideration) from the present error. [Note that the variable used here is LAG instead of LAGAV.]

From the above-mentioned three terms and by combining the second and third terms to be divided by a convenient constant of value 32 the following equation is obtained:

$$ADJ = (E_o - E_1) + \left( \frac{E_o - E_3 + ADJ2}{32} \times \frac{1}{m} \right),$$

where $E_1$ is the phase error for the previously sampled phase, and m is a variable which is varied in accordance with a test which determines whether $E_o$ is positive or negative and whether rate of change is positive or negative. Since it is more important to correct the phase lag error when it is negative (since this condition occurs with sudden increasing load transients) the following values for m have been found to be convenient:

($E_1$-$E_3$) and $E_o$ positive-m=128, (worsening error),
($E_o$-$E_3$) positive but $E_o$ negative-m=256, (lessening error),
($E_o$-$E_3$) and $E_o$ negative-m=32, and (worsening error),
($E_o$-$E_3$) negative and $E_o$ positive-m=512, (lessening error).

In the above equation the first term can be regarded as a coarse adjustment to keep the notch width constant, and the second term as a fine adjustment. If the notch adjustment mode is adopted the coarse adjustment is carried out by the operations of FIG. 12. Thus when the calculation subroutine 56 has been completed only a fine adjustment corresponding to the second term of the equation for the second simplified algorithm is required for the immediate adjustment. However if the normal firing adjustment mode is adopted then both the coarse and fine adjustments have to be taken into account in adjusting the value of OCR. The two terms in ADJ are calculated in the operation 60 as before but they are stored separately rather than as sum.

The variable NOTCH is updated by the operation 159 following operation 65 of FIG. 4 which now stores the fine adjustment by setting NOTCH=NOTCH+(-the fine adjustment).

FIG. 13 shows the operations carried out in the immediate adjustment which follows the calculation subroutine of FIG. 4. A test 154 determines from a previously set flag whether the notch mode adjustment or firing mode adjustment is being carried out. If it is the firing mode adjustment, an operation 160 sets the firing adjustment ADJ to equal ($E_o$-$E_1$)+the fine adjustment and then a test 155 checks if the previous sample phase before the present one is still waiting to be fired. If so the OCR is not adjusted (it would be charging the firing angle of the wrong phase) and a return occurs in FIG. 4. Firing adjustment is then carried out at the end of the next firing pulse in operation 96 of FIG. 6. If there is time to adjust OCR then an operation 156 takes place in which the full value of a variable ADJ is added to the variable OCR and ADJ is set to zero.

If the test 154 indicates that the notch adjustment mode is being carried out then a test 157 determines whether there is sufficient time for OCR to be updated. If not a return occurs to the test 41 but otherwise an operation 158 is carried out in which only the fine adjustment or second term in the above equation is added to the contents of OCR, the "coarse" adjustment having already been made by the operations of FIG. 12.

While an embodiment of the invention has been described it will be realised that the invention can be put into practice in many other ways. Different circuits may be used and the ways of detecting stalling and phase lag described herein are exemplary only, as is the program described.

I claim:

1. A power controller for an induction motor which operates from an alternating current supply having at least two phases, comprising:
    a first SCR device connected between one phase of said alternating current supply and said induction motor;
    a second SCR device connected between a second phase of said alternating current supply and said induction motor;
    SCR firing current control means, connected to control inputs of each of the SCR devices, for supplying firing signal thereto;
    sampling means, coupled to at least one phase of supply to said motor, for periodically sampling a back e.m.f. of said at least one phase of the motor;
    means, coupled to said sampling means, for detecting said sampled back e.m.f. falling below a predetermined value as an indication of stalling;
    counting means, connected to said detecting means, for maintaining a stall count, said counting means controlled to increment said stall count whenever said back e.m.f. falls below said predetermined value;
    reset means, coupled to said counting means, for resetting said timer to a zero count at predetermined intervals;
    current/voltage determining means, coupled to said at least one phase of supply to said motor, for determining a current and a voltage in said at least one phase of supply to the motor;

phase lag determining means, coupled to said current-/voltage determining means, for determining a phase lag of said determined voltage behind said determined current in said at least one phase of supply to the motor;

controlling means, coupled to said SCR firing current control means, for controlling said SCR firing current control means to generate phase angles variable in dependence on said phase lag of voltage to current; and means for adjusting said phase angles dependent on said stall count signal, said angles being adjusted such that a single stall count signal causes less than a full on condition of said motor.

2. A controller according to claim 1 further comprises means for determining a load on the motor, and wherein said phase angles used by said controlling means are dependent on said phase lag of voltage to current and said determined motor load.

3. A controller according to claim 1 wherein the processor means includes means for determining an error signal from said phase lag and a reference signal and said controlling means generates firing signals at times which depend on both the error signal and the stall count signal.

4. A controller according to claim 1 further comprising:
 current sensing means for generating first signals when the current through at least one of said switching means ceases;
 voltage sensing means for generating second signals representative of a phase of at least one of the supply phases; and
 means for determining said phase lag of current from the first and second signal.

5. A controller according to claim 4 wherein the processor means adjusts the phase angle at which firing occurs in a supply phase in accordance with an error signal determined from said first and second signals for that phase immediately preceding the generation of firing signals in that phase if the error signal can be determined before the next firing signal is required, but if not in accordance with the previous interval of non-conduction in the preceding phase to conduct.

6. A controller according to claim 2 further comprising means for selectively repetitively determining an angle at which a firing signal is generated by adding an adjustment plus a predetermined angle to an angle at which the last firing signal occurred, the adjustment being dependent on the stall count signal and the motor load.

7. A controller according to claim 6 wherein the predetermined angle is 360° divided by twice the number of phases in the motor to be controlled.

8. A controller according to claim 3 further comprising means for selectively repetitively determining an angle at which a firing signal is generated by adding an adjustment plus a predetermined angle to an angle at which the last firing signal occurred, the adjustment being dependent on the stall count signal and the motor load, and being determined from:
 (a) a proportional term dependent on a present value of a present error signal,
 (b) a differential term dependent on a difference between said present error signal and a previous error signal,
 (c) an integral term obtained by considering the present error signal, the previous error signal and a preceding previous error signal, and
 (d) a term dependent on an adjustment signal derived from said stall count signal.

9. A controller according to claim 3 further comprising means for selectively repetitively determining an angle at which a firing signal is generated by adding an adjustment plus a predetermined angle to the angle at which the last firing signal occurred, the adjustment being dependent on the stall count signal and the motor load, and being determined from an equation having the following terms:
 a term dependent on a difference between a present error signal and a previous error signal, and
 a term dependent on the error signal and an adjustment signal derived from the stall count signal.

10. A controller according to claim 9 wherein the second term is multiplied by a variable which depends on both the sign of the present error signal and the sign of the rate of change thereof.

11. A controller according to claim 3 wherein said controlling means adjusts the generation of firing signals such that the interval of non-conduction in each supply phase is adjusted by a coarse adjustment dependent on the difference between the current and previous error signals, and a fine adjustment dependent on the stall count signal and on the error signal.

12. A controller according to claim 8 wherein the processor means is arranged to decrease the said phase angles by increasing the said adjustment signal by a predetermined step if the stall count signal is greater than a predetermined value.

13. A controller according to claim 12 further comprising means for reducing the said adjustment signal periodically if the stall count signal indicates that there is no tendency to stall.

14. A controller according to claim 9 including
 means for applying a voltage representative of the back e.m.f. of a motor controlled by the controller to the processor means, wherein the processor means is arranged to detect the occurrence of a stall when the back e.m.f. in one or more motor phases falls to a predetermined level, to count the number of the said occurrences in a further predetermined time interval to form the stall count signal, and to increase the said adjustment signal by a predetermined step if the stall count signal is greater than a predetermined value.

15. A controller according to claim 14 further comprising means for reducing the said adjustment signal periodically if the stall count signal indicates that there is no tendency to stall.

16. A controller according to claim 10 further comprising means for reducing the size of the said steps in proportion to the time in each half cycle of at least one phase of the supply voltage in which current is not supplied to the motor.

17. A controller according to claim 16 further comprising means for increasing said phase angles by reducing said adjustment signal periodically if the stall count signal indicates that there is no tendency to stall.

18. A controller according to claim 3 further comprising means for initiating a starting procedure when the motor is to be started during which firing signals are initially generated at times which provide a short interval of conduction in each mains supply period, means for progressively increasing an interval of conduction at least until said stall signal indicates that the back e.m.f. has risen above a threshold value, and means for setting the reference signal to a value dependent on the phase lag at said time of rising above said threshold value to provide an initial value for the reference angle when the starting procedure has been completed.

19. A power controller according to claim 1 wherein further comprising means for resetting the stall count signal when
   (a) a first condition occurs in which a predetermined interval has elapsed since the stall count signal was last reset, and
   (b) when a second condition occurs in which the stall count signal rises above a predetermined value, and wherein said processor means includes means for increasing said phase angles at which the said firing signals are generated when the first condition occurs and decreasing said phase angles when the second condition occurs.

20. A power controller for an induction motor which operates from an alternating current supply having at least two phases, comprising:
   a first SCR device connected between one phase of said alternating current supply and said induction motor;
   a second SCR device connected between a second phase of said alternating current supply and said induction motor;
   SCR firing current control means, connected to control inputs of each of the SCR devices, for supplying firing signals thereto;
   sampling means, coupled to at least one phase of said supply to said motor, for periodically sampling a back e.m.f. of said at least one phase of the motor;
   means, coupled to said sampling means, for detecting said sampled back e.m.f. falling below a predetermined value;
   counter means, connected to said detecting means for maintaining a stall count by incrementing said stall count whenever said back e.m.f. falls below said predetermined value;
   reset means, coupled to said counter means, for resetting said counter means to a zero count at predetermined intervals;
   current/voltage determining means, coupled to said at least one phase of supply to said motor, for determining a current and a voltage in said at least one phase of supply to the motor;
   phase lag determining means, coupled to said current/voltage determining means, for determining a phase lag of said determined voltage behind said determined current in said at least one phase of supply to the motor;
   means for progressively increasing an interval of conduction during starting of said motor, at least until said stall count indicates that the back e.m.f. has risen above a threshold value;
   reference signal setting means, connected to said phase lag determining means, for setting a reference signal to a value dependent on said phase lag when said stall count signal indicates that the back e.m.f. has risen above said threshold value, as a working value for the reference angle when the starting procedure has been completed, whereby said reference signal is set to an optimum value for full load of said motor;
   means for determining an error signal from said phase lag and said reference signal;
   automatic self-adjustment means, coupled to said counter means, for generating a self-adjustment signal from said stall count signal; and
   controlling means, coupled to said SCR firing current control means, for controlling said SCR firing current control means to generate firing signals at phase angles variable in dependence on said error signal and said self-adjustment signal, whereby said phase angles of said firing signals are progressively adjusted to optimize operation at light load of said motor, and wherein a stall count signal of a value one causes both of said SCR devices to conduct for less than a full half cycle of said alternating current supply.

* * * * *